United States Patent
Maschke et al.

(10) Patent No.: US 9,531,239 B2
(45) Date of Patent: Dec. 27, 2016

(54) ACTIVE COOLING OF A MOTOR HAVING AN INTEGRATED COOLING CHANNEL

(71) Applicant: ebm-papst Mulfingen GmbH & Co. KG, Mulfingen (DE)

(72) Inventors: Matthias Maschke, Kupferzell (DE); Erik Reichert, Boxberg (DE); Friedrich Schaffert, Schrozberg (DE); Michael Sturm, Bad Mergentheim-Rot (DE); Astrid Wunderlich, Mulfingen-Jagstberg (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 14/418,243

(22) PCT Filed: Jul. 17, 2013

(86) PCT No.: PCT/EP2013/065097
§ 371 (c)(1),
(2) Date: Jan. 29, 2015

(87) PCT Pub. No.: WO2014/019853
PCT Pub. Date: Feb. 6, 2014

(65) Prior Publication Data
US 2015/0263591 A1    Sep. 17, 2015

(30) Foreign Application Priority Data
Aug. 2, 2012  (DE) ......................... 10 2012 107 109

(51) Int. Cl.
*H02K 9/06*    (2006.01)
*H02K 5/18*    (2006.01)
(Continued)

(52) U.S. Cl.
CPC ....... *H02K 9/06* (2013.01); *H02K 5/18* (2013.01); *H02K 5/20* (2013.01); *H02K 5/22* (2013.01); *H02K 9/14* (2013.01); *H02K 11/33* (2016.01)

(58) Field of Classification Search
CPC ........ H02K 5/20; H02K 9/06; H02K 11/0073; H02K 5/18
(Continued)

(56) References Cited

U.S. PATENT DOCUMENTS 4,908,538 A * 3/1990 Geberth, Jr. ............. H02K 5/20
                                                  310/227
5,814,908 A    9/1998 Muszynski
(Continued)

FOREIGN PATENT DOCUMENTS

DE    103 13 273 A1    10/2004
JP    2005-192364 A     7/2005
(Continued)

OTHER PUBLICATIONS

International Search Report of PCT/EP2013/065097, mailed Jun. 25, 2014.

*Primary Examiner* — Naishadh Desai
(74) *Attorney, Agent, or Firm* — Collard & Roe, P.C.

(57) ABSTRACT

A motor, comprising an electronics housing having integrated motor electronics, a stator, and a rotor. The stator comprises a stator bushing and a laminated stator core having motor windings. The stator bushing is arranged axially between the electronics housing and the rotor. The motor according to the invention has an air-conveying element connected to the rotor in a rotationally fixed manner and at least one axially extending passage opening arranged in the stator bushing. The air-conveying element is arranged axially between the stator bushing and the rotor and has a circumferential axial intake opening on the side of the stator bushing. During motor operation, the air-conveying element sucks in an axial volumetric air flow at an external wall of (Continued)

Figure 1:
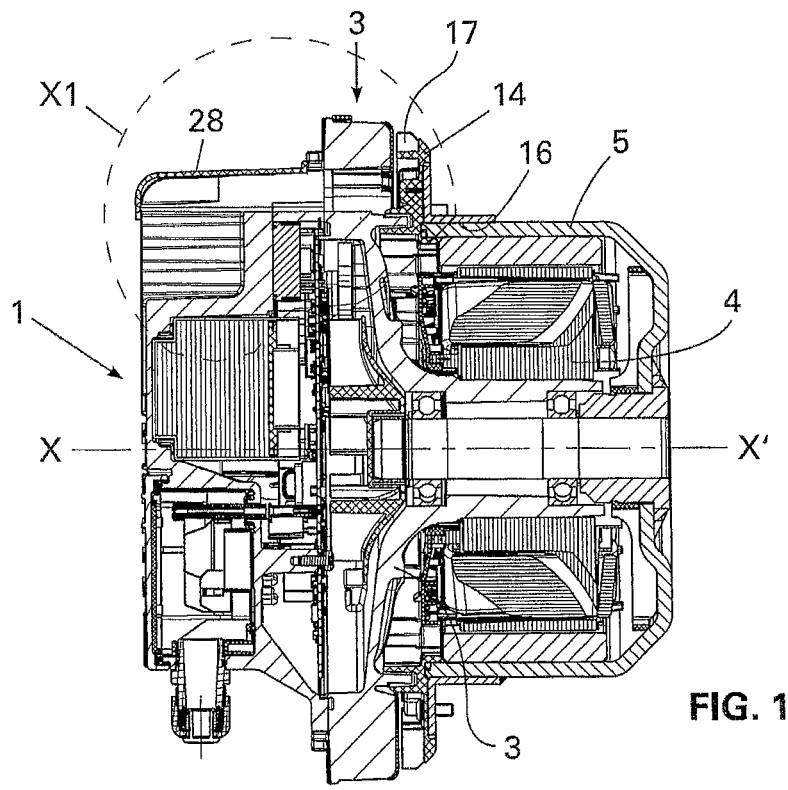

the electronics housing through the intake opening and the passage opening.

15 Claims, 3 Drawing Sheets

(51) Int. Cl.
  *H02K 5/20* (2006.01)
  *H02K 9/14* (2006.01)
  *H02K 5/22* (2006.01)
(58) Field of Classification Search
  USPC .................................................... 310/62, 63
  See application file for complete search history.

(56) References Cited

U.S. PATENT DOCUMENTS

| | | | | |
|---|---|---|---|---|
| 6,119,636 A | * | 9/2000 | Fan | F02B 63/04 |
| | | | | 123/2 |
| 2005/0116554 A1 | * | 6/2005 | Dano | H02K 11/0073 |
| | | | | 310/58 |
| 2009/0028730 A1 | * | 1/2009 | Radermacher | F04D 29/4206 |
| | | | | 417/423.8 |
| 2011/0074235 A1 | | 3/2011 | Leung et al. | |
| 2011/0148230 A1 | * | 6/2011 | Knorr | H02K 1/2786 |
| | | | | 310/62 |
| 2011/0229358 A1 | * | 9/2011 | Streng | F04D 25/082 |
| | | | | 417/423.14 |

FOREIGN PATENT DOCUMENTS

| | | |
|---|---|---|
| WO | 97/41630 A1 | 11/1997 |
| WO | 2009/063774 A1 | 5/2009 |

\* cited by examiner

ACTIVE COOLING OF A MOTOR HAVING AN INTEGRATED COOLING CHANNEL

CROSS REFERENCE TO RELATED APPLICATIONS

This application is the National Stage of PCT/EP2013/065097 filed on Jul. 17, 2013, which claims priority under 35 U.S.C. §119 of German Application No. 10 2012 107 109.8 filed on Aug. 2, 2012, the disclosures of which are incorporated by reference. The international application under PCT article 21(2) was not published in English.

The invention relates to a motor comprising an electronics housing having integrated motor electronics, a stator, and a rotor, wherein the stator comprises a stator bushing and a laminated stator core having motor windings, and wherein the stator bushing is disposed axially between the electronics housing and the rotor.

Such motors are particularly used for driving fans. The maximal power range of the motors having integrated electronics, particularly commutation electronics, is generally limited by the maximal component temperatures of the electronics, for example of the electrical power components, such as power amplifiers, or of the motor, for example of the motor winding or of the ball bearings. The lifetime of the motor is also dependent on the component temperatures reached during operation of the motor, whereby elevated temperatures shorten the lifetime of the motor.

The motors are particularly attached to a stable attachment wall or supporting construction. For this purpose, the stator of the motor is usually inserted into an installation opening of the attachment wall or into a frame of the supporting construction with its stator bushing, and screwed onto the attachment wall or the supporting construction in an edge region of the stator bushing. Such attachment makes effective cooling of the motor and of the electronics more difficult, because flow around the motor and the electronics housing in the axial direction of the motor is hindered by the attachment wall or supporting construction. Furthermore, particularly in the case of radial fans, flow around the motor and, in particular, the electronics housing is poor or does not occur at all, due to the radial outflow of the air. In the case of axial fans, what is called a dead water area is formed in the region of the rotor bell, and this also has a negative influence on flow around the motor.

The invention is based on the task of creating a motor, the cooling of which is improved and the power and lifetime of which are increased, at the same ambient temperature.

In the case of a motor of the type described initially, this task is accomplished, according to the invention, by means of an air-conveying element connected with the rotor in torque-proof manner, and at least one passage opening that runs axially and is disposed in the stator bushing, wherein the air-conveying element is disposed axially between the stator bushing and the rotor and has a circumferential axial intake opening on the side of the stator bushing, and wherein the air-conveying element, during motor operation, draws in an axial air volume stream through the intake opening and the passage opening on an outside wall of the electronics housing. In particular, the air-conveying element is configured as a radial fan wheel, which draws air in axially at the intake opening, and blows it out radially at a circumferential radial opening.

Such a motor allows active and targeted cooling, particularly of the electronics housing and of the motor electronics disposed in it, by means of an air volume stream generated by the air-conveying element. The air volume stream is guided, in targeted manner, to the regions of the motor that are particularly supposed to be cooled, using the passage opening in the stator bushing, and thereby allows particularly effective cooling. In this way, increased power and a longer lifetime of the motor are made possible. Depending on the embodiment of the motor or depending on the application and installation situation, particularly when the motor is installed in an installation wall, the ambient air in the region of the electronics housing has a lower temperature than in the region of the rotor, something that is additionally utilized by means of drawing in the air volume stream at the outer circumference of the electronics housing.

In a further embodiment of the invention, the passage opening of the stator bushing is disposed radially at the same height as a region of the outside wall of the electronics housing that is to be cooled. In particular, the intake opening is furthermore disposed radially at the same height as the passage opening of the stator bushing.

This has the advantage that passage opening, intake opening, and the outside wall of the electronics housing that is to be cooled lie radially at the same height and thereby the air volume stream can be guided through the motor in particularly simple and effective manner. As a result, a particularly compact construction of the motor is also promoted.

Furthermore, in an embodiment of the invention, a ring-shaped cover disk is disposed on the stator between the air-conveying element and the stator bushing. In this connection, it is advantageous if the air-conveying element, during motor operation, radially draws in an axial air volume stream through the intake opening and through a passage opening formed by the cover disk and between the stator cooling ribs along an outside wall of the stator bushing, on the outer edge of the outside wall of the stator bushing. This allows targeted additional cooling of the stator bushing, in that the cover disk, together with the outside wall of the stator bushing and the stator cooling ribs, forms multiple cooling channels through which the air volume stream is guided.

In a further embodiment of the invention, the stator bushing is divided into a base stator bushing and a supporting ring, wherein the supporting ring is attached to the outer circumference of the base stator bushing and forms a circumferential ring around the base stator bushing, and the passage opening of the stator bushing is disposed in the supporting ring. This makes it possible for the supporting ring to be set onto conventional stators that do not have a passage opening, in order to make the passage opening that is required for the cooling effect available, and to allow an axial air volume stream from the rotor to the electronics housing. Thereby it is possible to make a motor according to the invention available without modifications of conventional stators, based on conventional motors, in that a supporting ring and a matching air-conveying element are mounted on a conventional motor.

Preferably, the electronics housing has housing cooling ribs on its outside wall, wherein the housing cooling ribs run axially from the face side of the electronics housing all the way to the passage opening of the stator bushing and end, in terms of height, with the radially outer edge of the passage opening, and, in particular, the motor has a housing cover that radially covers at least a part of the housing cooling ribs. This has the advantage of increasing the flow velocity between the housing cooling ribs of the electronics housing and of lengthening the flow path through the housing cooling ribs, so that the cooling effect is additionally increased.

Figure 1A:
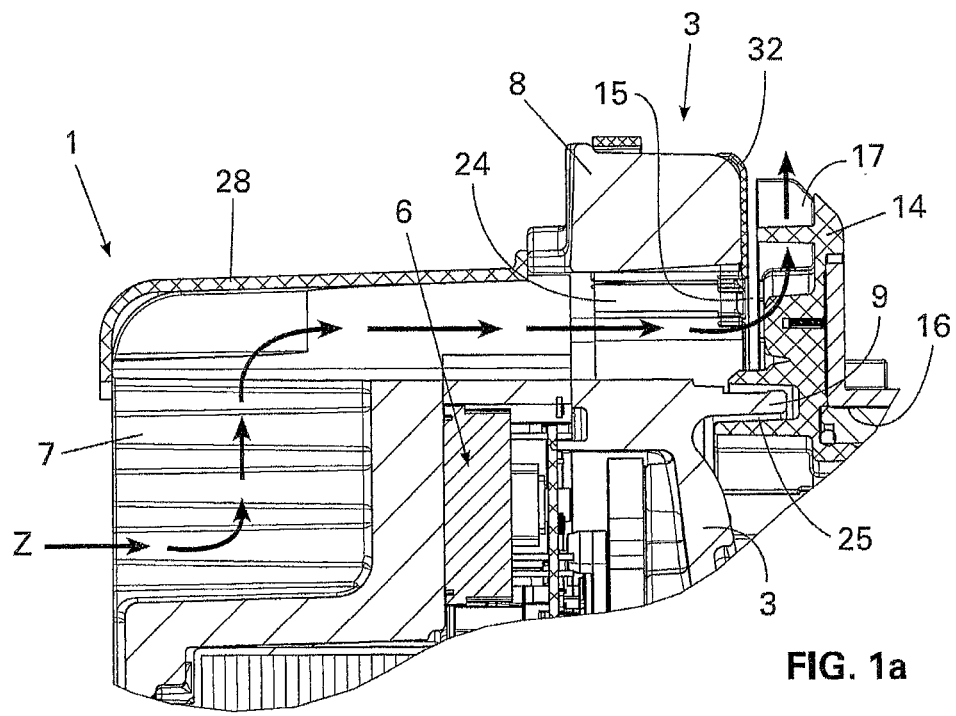
Figure 2:
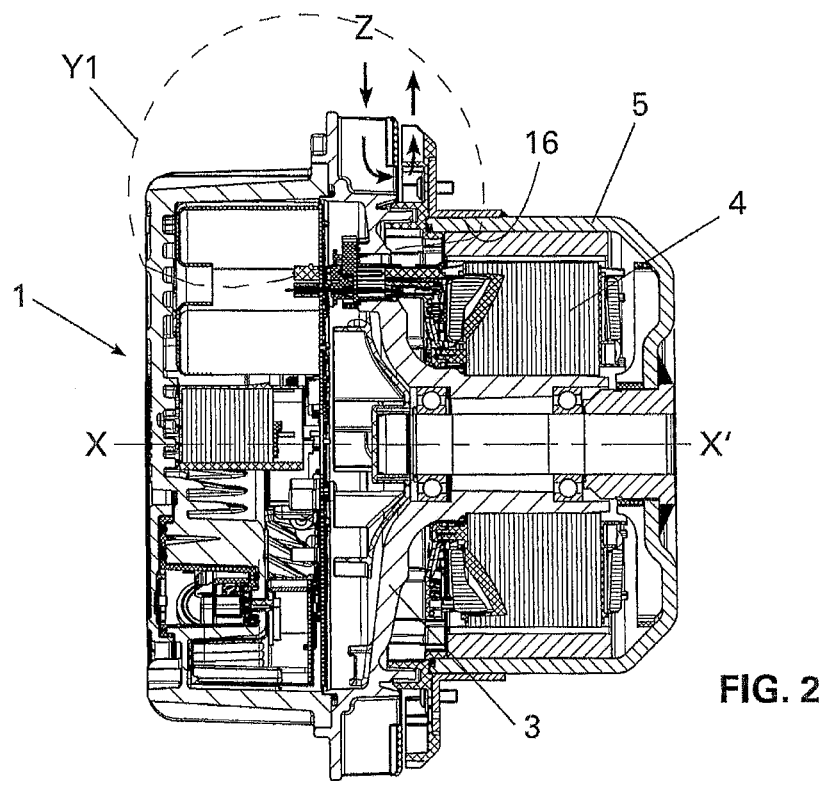
Figure 2A:
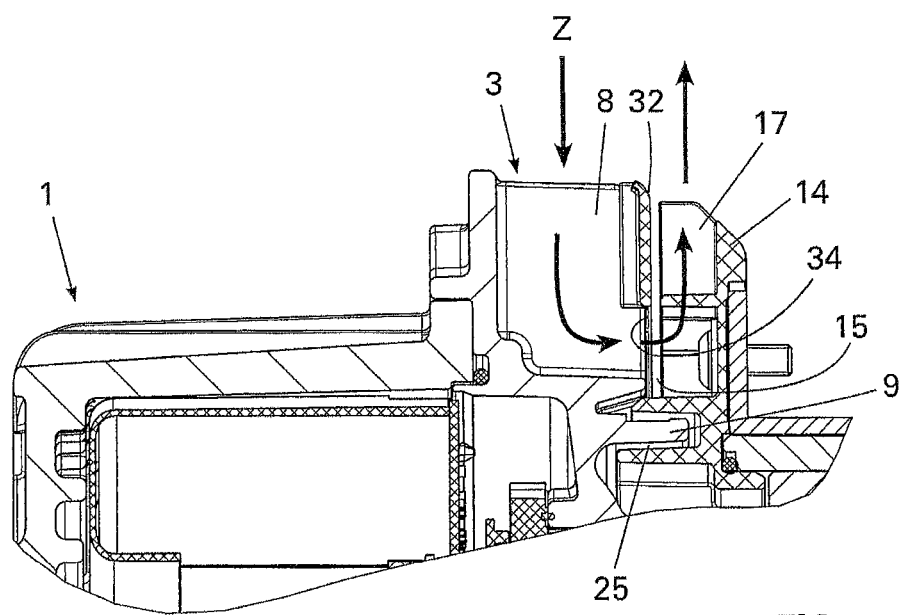
Figure 3:
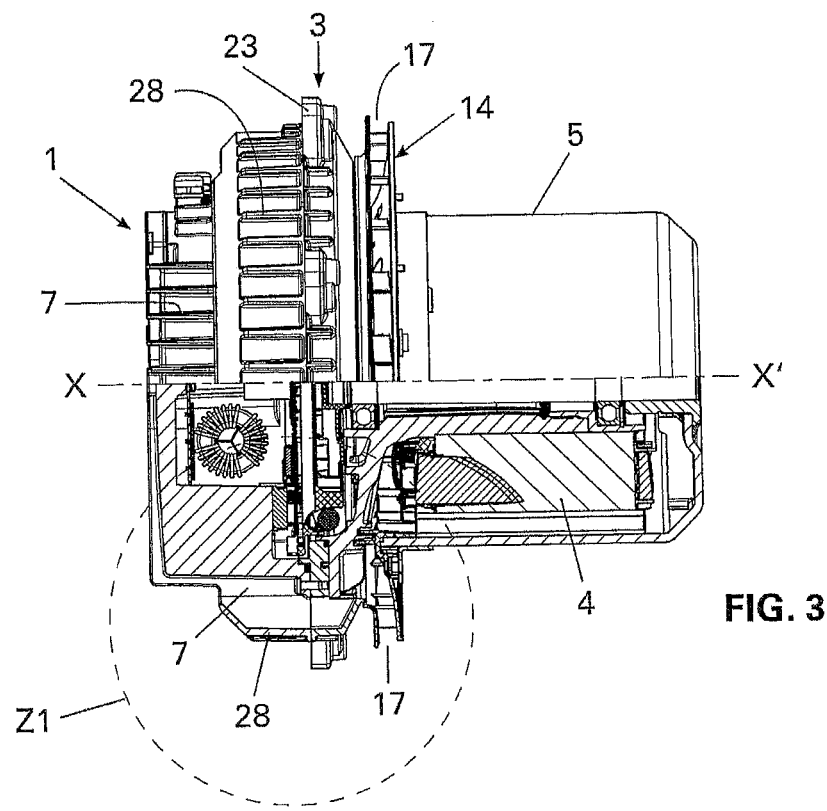
Figure 3A:
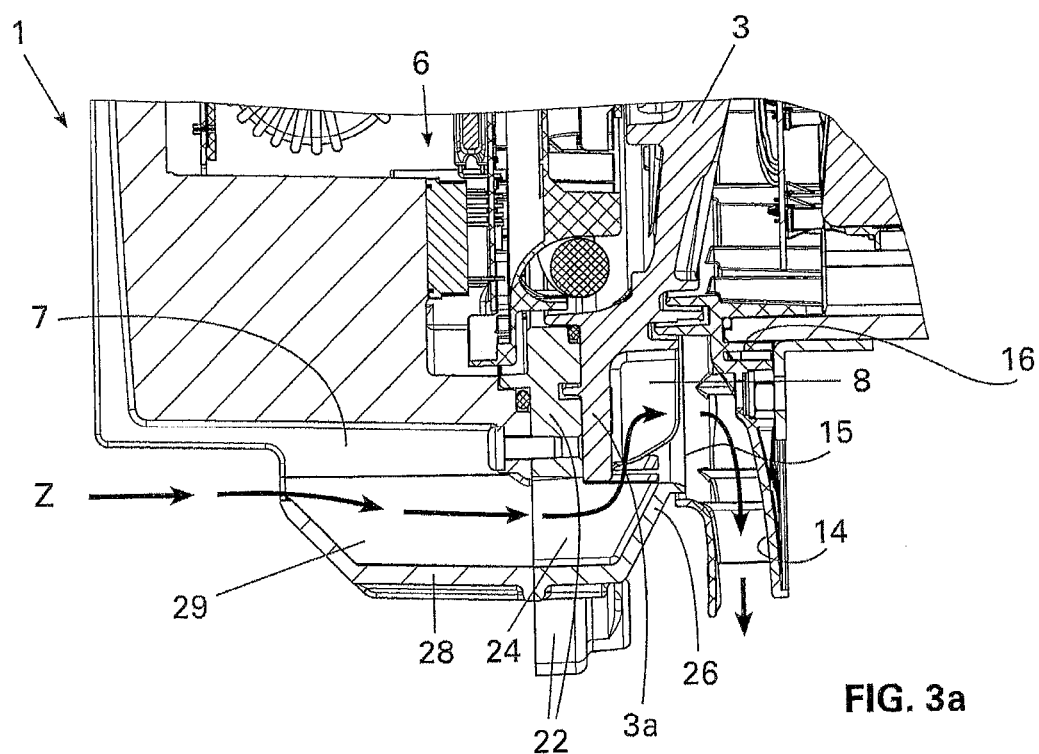

Further details, characteristics, and advantageous further developments of the invention are evident from the exemplary embodiments described below and shown in the drawings, as well as from the dependent claims. The drawings show:

FIG. 1 a cross-section in the region of the passage opening of the stator bushing of a motor according to the invention, according to Exemplary Embodiment 1, FIG. 1a an enlarged representation in the region X1 according to FIG. 1, FIG. 2 a cross-section not in the region of the passage opening of the stator bushing of a motor according to the invention, according to Exemplary Embodiment 1, FIG. 2a an enlarged representation in the region Y1 according to FIG. 2, FIG. 3 a side view with partial cross-section in the region of the passage opening of a motor according to the invention, according to Exemplary Embodiment 2, FIG. 3a an enlarged representation in the region Z1 according to FIG. 3.

The same components are provided with the same reference symbols in all the figures.

FIG. 1/1a, FIG. 2/2a show a first embodiment, and FIG. 3/3a shows a further embodiment of a motor according to the invention, particularly of an external rotor motor according to the invention. The motor comprises an electronics housing 1, a stator comprising a stator bushing 3 and a laminated stator core 4 having motor windings, and a rotor 5, particularly an external rotor rotor. The stator bushing 3 is disposed axially between the electronics housing 1 and the rotor 5. The stator bushing 3 and the electronics housing 1 are particularly made of metal. In the electronics housing 1, there are motor electronics for drive and control of the motor, among other things, particularly commutation electronics having electrical power components 6, such as power amplifiers. The electronics housing 1 has housing cooling ribs 7 on its outside wall, for cooling the motor electronics within the electronics housing 1. The stator bushing 3 has stator cooling ribs 8 on its outside wall that lies opposite the rotor 5, which ribs run radially and extend axially in the direction of the rotor 5, and conduct away the heat that particularly occurs in a stator ball bearing and the motor windings.

Furthermore, the motor according to the invention comprises an air-conveying element 14 disposed axially between the stator bushing 3 and the rotor 5. The air-conveying element 14 is particularly configured as a radial fan wheel. The air-conveying element 14 is connected, in torque-proof manner, with the rotor 5 with a central passage opening 16. The air-conveying element 14 particularly consists of plastic. The passage opening 16 of the air-conveying element 14 is particularly covered by the rotor 5 on the rotor side. The air-conveying element 14 has a circumferential intake opening 15 as an air inlet on the side of the stator bushing 3, and a circumferential radial opening 17 as an air outlet radially on the outer circumference. The air-conveying element 14 particularly, as shown in FIG. 3/3a, has a front cover disk that surrounds the intake opening 15 and a rear attachment disk provided with a sheet-metal round and a passage opening 16, wherein multiple blades are disposed in between. Alternatively, as shown in FIG. 1/1a and FIG. 2/2a, an air-conveying element 14 without a front cover disk can also be used. During motor operation, the air-conveying element 14 draws air in through the intake opening 15, through the air-conveying element 14, and blows it out radially at the radial opening 17.

For fluidic optimization and for a seal between stator bushing 3 and air-conveying element 14, the stator bushing 3 has a ring collar 9 that runs axially on the side of the air-conveying element 14 and reaches into a circumferential ring groove 25 disposed on the inner circumference of the passage opening 16 of the air-conveying element 14.

FIG. 1/1a and FIG. 2/2a show a first embodiment of a motor according to the invention. The stator bushing 3 has at least one axial passage opening 24 in a radially outer edge region. The passage opening 24 is disposed on the circumference of the stator bushing 3 and radially in such a manner that it is disposed at the same height as a region of the outside wall of the electronics housing 1 that is to be cooled, and thereby lies opposite this region.

The housing cooling ribs 7 are preferably configured to be particularly thick in the region to be cooled, i.e. having a particularly large outer surface, so that multiple parallel housing cooling ribs 7 run from the face side of the electronics housing 1 axially all the way to the passage opening 24 of the stator bushing, wherein they end, in terms of height, at the radially outer edge of the passage opening 24. Preferably, the housing cooling ribs 7 are covered radially by a housing cover 28, at least in part. The housing cover 28 is particularly configured in one piece with the electronics housing or with the stator bushing 3.

In the embodiment according to FIG. 1/1a, the intake opening 15 of the air-conveying element 14 is particularly disposed radially at the same height as the passage opening 24 and the stator cooling ribs 8 of the stator bushing 3, and thereby lies opposite the passage opening 24 and the stator cooling ribs 8.

Air is axially drawn in by means of the air-conveying element 14, in the region of the passage opening 24 and in the region of the interstices between the stator cooling ribs 8 of the stator bushing 3, and blown out radially in accordance with the circumference. An air volume stream Z that runs approximately parallel to the motor axis X-X' occurs in the region of the passage opening 24. According to the invention, this air volume stream Z is guided within the motor according to the invention by means of an integrated cooling channel that comprises at least the air-conveying element 14 and the passage opening 24 in the stator bushing 3.

In the first embodiment shown in FIG. 1/1a, the integrated cooling channel is formed by the housing cooling ribs 7, the housing cover 28 and the outside wall of the electronics housing 1, the passage opening 24 of the stator bushing 3, and the air-conveying element 14. In this embodiment, the air volume stream Z is first drawn in on the face side of the electronics housing 1 and guided, in targeted manner, over the surface of the outside wall of the electronics housing 1 and between the housing cooling ribs 7; after that it flows through the passage opening 24 of the stator bushing 3 and is drawn into the intake opening 15 of the air-conveying element 14 and blown out radially by the air-conveying element 14. Because it flows over heated surfaces and cooling ribs, the air volume stream Z heats up and thereby cools the electronics housing 1 and the stator.

FIG. 2/2a shows a cross-section through a region of the stator bushing 3 between two stator cooling ribs 8, in which region no passage opening 24 is present. Because the air-conveying element 14 produces a partial vacuum at its intake opening 15 also in this region of the stator bushing 3, the air volume stream Z is drawn in radially at the outer edge of the stator bushing 3 and flows radially along the outside wall and between the stator cooling ribs 8 of the stator bushing 3. As a result, additional cooling of the stator bushing 3 is achieved. In order to control and reinforce the additional cooling effect, a ring-shaped cover disk 32 can be disposed on the stator, particularly between the stator bushing 3 and the air-conveying element 14. The cover disk 32 is attached to the stator bushing 3, preferably to the stator cooling ribs 8. The cover disk 32 is configured in such a manner that it runs radially from an outer edge of the passage opening 24 all the way to an outer edge of the stator bushing 3, so that the passage opening 24 lies radially below the inner edge of the cover disk 32 and is not covered by the cover disk 32. Furthermore, the cover disk 32, the stator bushing 3, and the stator cooling ribs 8 are configured in such a manner that multiple passage openings 34, distributed over the circumference, are formed in the region of the stator bushing 3 in which no passage opening 24 is present, according to FIG. 2/2a, below the cover disk 32, between the inner edge of the cover disk 32, the outside wall of the stator bushing 3, and between the stator cooling ribs 8. Alternatively, the cover disk 32 can also be configured to be wider radially and to have multiple passage openings 34, particularly for being connected with the passage opening 24. The passage openings 34 allow optimized flow along the outside wall of the stator bushing 3 and between the stator cooling ribs 8.

The outside wall of the stator bushing 3, the stator cooling ribs 8, and the cover disk 32, together with the air-conveying element 14, form a second integrated cooling channel. The air volume stream Z flows from the outer edge of the outside wall of the stator bushing 3 along the surface of the outside wall of the stator bushing 3 and between the stator cooling ribs 8, through the passage opening 34 formed by the cover disk 32, and from there into the intake opening 15, through the air-conveying element 14 to the radial opening 16 of the air-conveying element 14. Thereby the air volume stream Z is radially drawn in through the second integrated cooling channel during motor operation, by means of the air-conveying element 14, at the outer edge of the outside wall of the stator bushing 3, and then drawn in axially by the air-conveying element 14 and then blown out radially at the radial opening 17. Because it flows over heated surfaces and cooling ribs, the air volume stream Z heats up and thereby particularly cools the stator and the stator bushing 3.

In FIG. 3/3a, a second embodiment of a motor according to the invention is shown. The stator bushing 3 is divided into a base stator bushing 3a and a support ring 22. The support ring 22 is particularly disposed between the electronics housing 1 and the base stator bushing 3a, and connected with the base stator bushing 3a and, in particular, also with the electronics housing, in as good a thermally conductive manner as possible. The support ring 22 is attached to the outer circumference of the base stator bushing 3a and forms a circumferential ring around the base stator bushing 3a. On its outer circumference, the support ring 22 has attachment projections 23 for attaching the motor to an attachment wall, not shown, which projections run radially and are distributed over the circumference. The support ring 22 comprises at least one passage opening 24 that runs axially and is disposed in the ring wall of the ring. Alternatively, multiple passage openings 24 can also be distributed in the support ring 22, over its circumference.

The stator cooling ribs 8 of the stator preferably run radially inward from the outer edge of the outside wall of the base stator bushing 3a and extend axially from the rotor-side outside wall of the base stator bushing 3a in the direction of the air-conveying element 14. The intake opening 15 of the air-conveying element 14 and the stator cooling ribs 8 of the base stator bushing 3a are disposed radially in such a manner that they lie at the same height and opposite one another.

The passage opening 24 is particularly disposed in such a manner that it lies radially above an outer edge of the base stator bushing 3a and at the same height as the outside wall of the electronics housing 1, specifically in such a manner that it lies opposite a region of the circumference wall of the electronics housing 1 that is to be cooled.

The housing cooling ribs 7 are preferably configured to be particularly thick in the region of the electronics housing 1 to be cooled, so that multiple parallel housing cooling ribs 7 run from the face side of the electronics housing 1 axially all the way to the passage opening 24 of the support ring 22, wherein they end, in terms of height, at the radially outer edge of the passage opening 24. Preferably, the housing cooling ribs 7 are covered radially by a housing cover 28, at least in part. As shown in FIG. 3/3a, the housing cover 28 is particularly configured in shell shape, and sheathes the entire circumference of the electronics housing 1, so that in the case of multiple passage openings 24 in the support ring 22, multiple regions of the electronic housing 1 to be cooled are also covered, in other words the electronics housing 1 is cooled over its full circumference. Separate parallel cooling channels 29 are formed between the circumferentially disposed housing cooling ribs 7 and the housing cover 28, as a result. The housing cover 28 is adapted, in terms of its shape, to the shape of the circumference wall of the electronics housing 1 and of the housing cooling ribs 7, and can be configured not only as a separate part, particularly composed of plastic, can be attached to the electronics housing 1 or to the support ring 22, or can be configured in one piece with the electronics housing 1 or with the support ring 22.

On the side of the base stator bushing 3a, the support ring 22 has a ring wall 26 that narrows conically, in funnel shape, in the direction of the air-conveying element 14 and covers the stator cooling ribs 8. The ring wall 26 runs all the way to the radially outer edge of the intake opening 15 of the air-conveying element 14, so that the support ring 22 sheathes the base stator bushing 3a and the stator cooling ribs 8 circumferentially, and a flow space is formed between the outside wall and the stator cooling ribs 8 of the base stator bushing 3a, the intake opening 15 of the air-conveying element 14, and the ring wall 26 of the support ring 22. The support ring 22 is particularly made of metal, and the passage opening 24 and the ring wall 26 are preferably configured so that they are optimized in terms of flow technology.

The air-conveying element 14 is preferably mounted on the rotor in torque-proof manner and generates a partial vacuum at the intake opening 15 during motor operation. As a result, air is axially drawn in from the flow space in the region of the stator cooling ribs 8 of the base stator bushing 3a. An air volume stream Z that runs approximately parallel to the motor axis X-X' occurs in the region of the passage opening 24. This air volume stream Z is guided, according to the invention, through an integrated cooling channel that comprises at least the air-conveying element 14 and the passage opening 24 of the support ring 22.

In the embodiment shown in FIG. 3/3a, the cooling channel integrated into the motor is formed by the housing cooling ribs 7, the housing cover 28 and the outside wall of the electronics housing 1, the passage opening 24 of the support ring 22, the rotor-side outside wall of the base stator bushing 3a, the stator cooling ribs 8, and the air-conveying element 14. The air volume stream Z first flows from the face side of the electronics housing 1 along the surface of the electronics housing 1 and between the housing cooling ribs 7, subsequently through the passage opening 24 and along the surface of the support ring 22 and the surface of the base stator bushing 3a and between the stator cooling ribs 8, through the flow chamber, and afterward through the intake opening 15 of the air-conveying element 14 and through the air-conveying element 14 and the radial opening 17, where the air volume stream Z is blown out. Because it flows over the heated surfaces and cooling ribs, the air volume stream Z heats up and thereby cools the motor electronics and the stator. The heated air volume stream Z is blown out into the environment at the radial opening 17 of the air-conveying element 14.

The second embodiment particularly has the advantage that the support ring 22 can be set onto conventional stators that do not have a passage opening 24, in order to form the integrated cooling channel according to the invention. Thereby it is possible to make the integrated cooling channel available without modifications of conventional stators.

In both embodiments, an increased flow velocity occurs in the region of the housing cooling ribs 7 of the electronics housing 1 and of the stator cooling ribs 8 of the stator bushing 3, by means of the air volume stream Z, which is actively conveyed by the air-conveying element 14 and is guided, in targeted manner, by the stator bushing 3 and by the support ring 22, respectively. In comparison with natural convection, in this way clearly greater heat transfer is achieved at the surfaces to be cooled. This leads to reduced component temperatures within the motor electronics as well as to lower temperatures in the stator. Furthermore, the required construction space of the motor is kept as small as possible. If there are multiple passage openings 24 in the stator bushing 3 or in the support ring 22, the inflow that is distributed uniformly over the circumference of the air-conveying element 14 has an advantageous effect on the aerodynamic efficiency of the air-conveying element 14.

The one-piece configuration of the stator bushing 3 in the first exemplary embodiment has the advantage, as compared with the two-part configuration with the support ring 22 in the second exemplary embodiment, that the assembly effort in the production of a motor according to the invention is reduced.

The invention is not restricted to the exemplary embodiments that are shown and described, but rather comprises all embodiments that have the same effect, in the sense of the invention. Furthermore, the invention is also not restricted to the combination of characteristics defined in each independent claim, until now, but rather can also be defined by any other desired combination of specific characteristics of all the individual characteristics disclosed in total. This means that fundamentally, practically any individual characteristic of the independent claim, in each instance, can be left out or replaced by at least one other individual characteristic disclosed at another point of the application. In this regard, the claims should be understood to be merely a first formulation attempt for the invention, in each instance.

The invention claimed is:
1. A motor comprising:
an electronics housing having:
integrated motor electronics,
a rotor,
and a stator comprising:
a stator bushing; and
a laminated stator core having motor windings, and
wherein the stator bushing is disposed axially between the electronics housing and the rotor, wherein the stator bushing comprises:
an air-conveying element connected with the rotor in torque-proof manner, and
at least one passage opening that runs axially and is disposed in the stator bushing, wherein the air-conveying element is disposed axially between the stator bushing and the rotor and has a circumferential axial intake opening on the side of the stator bushing, and wherein the air-conveying element, during motor operation, draws in an axial air volume stream through the intake opening and the passage opening on an outside wall of the electronics housing.

2. The motor according to claim 1, wherein the air-conveying element has a passage opening and is connected with the passage opening on the rotor in torque-proof manner.

3. The motor according to claim 2, wherein the rotor covers the passage opening of the air-conveying element axially on the rotor side.

4. The motor according to claim 1, wherein the air-conveying element is configured as a radial fan wheel, which draws air in axially at the intake opening, and blows it out radially at a circumferential radial opening.

5. The motor according to claim 1, wherein the passage opening of the stator bushing is disposed radially at the same height as a region of the outside wall of the electronics housing that is to be cooled.

6. The motor according to claim 1, wherein the intake opening is disposed radially at the same height as the passage opening of the stator bushing.

7. The motor according to claim 1, wherein the stator bushing has stator cooling ribs that run radially on the side of the rotor and extend axially.

8. The motor according to claim 1, wherein a ring-shaped cover disk is disposed on the stator between the air-conveying element and the stator bushing.

9. The motor according to claim 8, wherein the air-conveying element, during motor operation, radially draws in an axial air volume stream through the intake opening and through a passage opening formed by the cover disk and between the stator cooling ribs, along an outside wall of the stator bushing, at the outer edge of the outside wall of the stator bushing.

10. The motor according to claim 8, wherein the cover disk is configured in such a manner that it runs radially from an outer edge of the passage opening of the stator bushing all the way to an outer edge of the outside wall of the stator bushing.

11. The motor according to claim 8, wherein the cover disk is attached to the stator cooling ribs.

12. The motor according to claim 1, wherein the stator bushing is divided into a base stator bushing and a supporting ring, wherein the supporting ring is attached to the outer circumference of the base stator bushing and forms a circumferential ring around the base stator bushing, and the passage opening of the stator bushing is disposed in the supporting ring.

13. The motor according to claim 1, wherein the electronics housing has housing cooling ribs on its outside wall, wherein the housing cooling ribs run axially from the face side of the electronics housing all the way to the passage opening of the stator bushing, and end, in terms of height, with the radially outer edge of the passage opening.

14. The motor according to claim 13, wherein a housing cover radially covers at least a part of the housing cooling ribs.

15. The motor according to claim 14, wherein the housing cover and the electronics housing or the housing cover and the stator bushing are formed integrally.

* * * * *